United States Patent [19]

Matsunobu et al.

[11] Patent Number: 4,639,374

[45] Date of Patent: Jan. 27, 1987

[54] ALMOND NUT PASTE FOR BEVERAGES AND DESSERTS

[75] Inventors: Akira Matsunobu; Sumio Horishita; Tetsuo Yamada, all of Hyogo, Japan

[73] Assignee: Ton Company Ltd., Japan

[21] Appl. No.: 608,289

[22] Filed: May 8, 1984

Related U.S. Application Data

[63] Continuation-in-part of Ser. No. 375,633, May 6, 1982, abandoned.

[30] Foreign Application Priority Data

Nov. 9, 1981 [JP]  Japan ................................ 56-180180

[51] Int. Cl.$^4$ ........................ A23C 9/127; A23L 2/38; A23L 1/36; A23L 1/221
[52] U.S. Cl. ..................................... 426/43; 426/583; 426/598; 426/613; 426/632; 426/650
[58] Field of Search ................. 426/42, 43, 44, 61, 426/573, 576, 583, 584, 585, 598, 650, 632, 633, 590, 611, 613, 612

[56] References Cited

U.S. PATENT DOCUMENTS

| | | | |
|---|---|---|---|
| 2,068,051 | 6/1936 | Canton et al. | 426/633 |
| 2,217,701 | 10/1940 | Musher | 426/633 |
| 2,511,115 | 6/1950 | Lazier et al. | 426/633 |
| 2,511,119 | 6/1950 | Mitchell | 426/331 |
| 2,560,509 | 7/1951 | Harris et al. | 426/633 |
| 3,619,207 | 11/1971 | Dzurik et al. | 426/633 |
| 3,625,702 | 12/1971 | Exler | 426/590 |
| 3,903,311 | 9/1975 | Billerbeck et al. | 426/611 |
| 4,152,466 | 5/1979 | Deretchin | 426/613 |
| 4,364,966 | 12/1982 | Chang | 426/573 |
| 4,364,967 | 12/1982 | Black | 426/632 |

FOREIGN PATENT DOCUMENTS

| | | | |
|---|---|---|---|
| 2064670 | 6/1971 | France | 426/590 |
| 0120018 | 10/1918 | United Kingdom | 426/44 |

OTHER PUBLICATIONS

Lissant, Kenneth J.; *Emulsions and Emulsion Technology*, Part 1; Marcel Dekker, Inc., New York; ©1974, pp. 264–268.

*McCutcheon's Emulsifiers and Detergents*, McCutcheon Division, MC Publ. Co., Glen Rock, N.J.; ©1981, pp. 248–263.

*Primary Examiner*—Blondel Hazel
*Assistant Examiner*—Elizabeth C. Weimar
*Attorney, Agent, or Firm*—Sughrue, Mion, Zinn, Macpeak and Seas

[57] ABSTRACT

An almond nut paste for use in a beverage or dessert comprises an intimate mixture consisting essentially of a paste of unskinned, dry-roasted or oil-roasted almond nuts with or without a minor amount of other starch-poor nuts such as hazel nuts, pistachio nuts or macadamia nuts, substantially all of said nuts having a maximum particle size of not more than 105 microns, having more than 80% by weight of particles of a size not more than 25 microns and having more than 95% by weight of particles of a size not more than 46 microns, and two kinds of nonionic surfactants including a hydrophilic surfactant and a lipophilic surfactant, a thickener and a sugar. Methods of manufacturing beverages, sours, desserts, and syrups from the nut paste are also disclosed.

9 Claims, 1 Drawing Figure

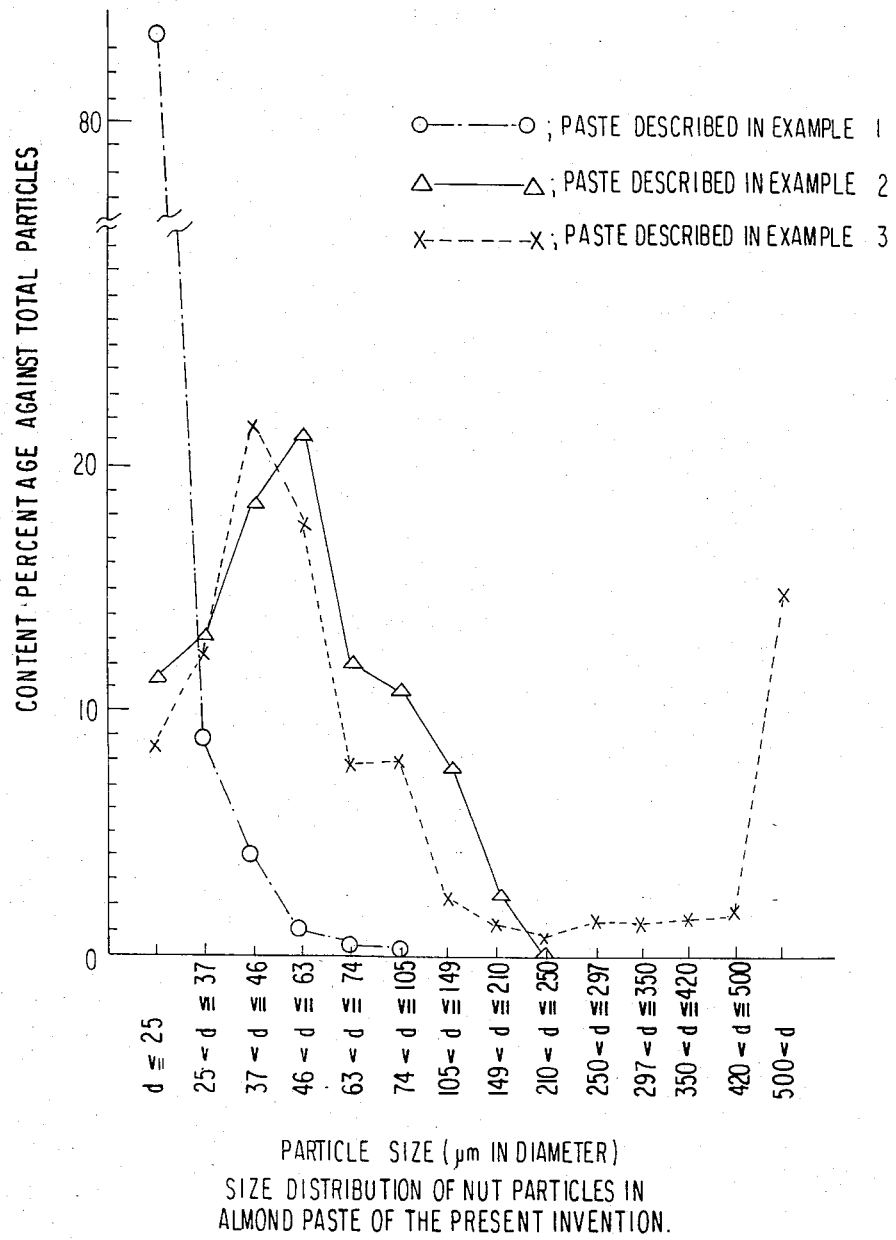
PARTICLE SIZE (μm IN DIAMETER)
SIZE DISTRIBUTION OF NUT PARTICLES IN
ALMOND PASTE OF THE PRESENT INVENTION.

ALMOND NUT PASTE FOR BEVERAGES AND DESSERTS

BACKGROUND OF THE INVENTION

This application is a continuation-in-part application of U.S. patent application Ser. No. 375,633, filed May 6, 1982 now abandoned.

1. Field of the Invention

This invention relates to a new use of almond nuts, particularly to an almond nut paste which is suitable for beverages and desserts, and applications thereof.

2. Description of the Prior Art

There are hundreds of nuts in the world. Most of them, except peanut, garbanzo and beans, are the nuts of woody plants, and they are mostly nutritious, as they are rich in proteins and fats. They are usually eaten as table luxuries or cocktail snacks after being shelled, roasted in heated air or in heated oil, and then salted.

Another use of nuts is in an application for nut butters and spreads, but this use is limited to use as a spread for breads, and toppings or fillings for cakes; therefore, there is a lack in versatile use for nuts.

To a large extent, the prior art appears to have concerned itself primarily with the use of peanuts, including use thereof in nut drinks as disclosed in U.S. Pat. No. 2,511,119 by Mitchell, whose product according to one test of ours still has poor dispersability in aqueous media, and in addition is not acceptable to everyone because of the peculiar flavor and taste derived from peanuts. See a 37 C.F.R. §1.132 Declaration filed Nov. 29, 1983 in parent application Ser. No. 375,633 of record in the file of this application. Other references concerned primarily with peanut pastes are U.S. Pat. No. 3,619,207 and U.S. Pat. No. 2,560,509, at least the latter of which contemplates utility for other nuts including almonds and mixtures thereof.

Turning to almond, which is one of the important agricultural products of the West Coast region of the United States, the study thereof to utilize its nutrition in applications has been low compared with peanuts, and the previous applications of almonds have almost been limited to centers, fillings or icings of cakes, candies, chocolates or ice cream, in the form of nuts or paste such as macaroon or marzipan in confectionary and bakery. As an exception, French Pat. No. 2,064,670 (1972) has disclosed the combined use of almonds and pistachios as a milky extract with sugar.

SUMMARY OF THE INVENTION

An object of the present invention is to solve the above-mentioned problems regarding nuts and to provide a novel means for utilizing almond. A more concrete object of the present invention is to provide a digestible almond paste and applications thereof.

According to this invention, there is provided an almond paste suitable for use in a beverage or a dessert, which essentially comprises a paste of unskinned, and dry- or oil-roasted almonds, a surfactant, a thickener and a sugar, said mixture being substantially free from any coarse particles having a diameter over 105 microns, as hereinafter detailedly described.

BRIEF DESCRIPTION OF THE DRAWING

The FIGURE is a graph showing the particle size distribution of an almond paste of this invention.

BRIEF DESCRIPTION OF THE INVENTION

As the result of extensive experiments and tests, the inventors have found that it is most suitable to use almonds in the form of a finely divided paste for a dairy beverage or, gelled or soured products derived therefrom. If the nuts (hereinafter the term "nuts" means almonds unless otherwise noted) are ground into a fine paste, indigestible fibrous materials in the nuts are crushed, and their proteins and fats are released. It has experimentally been ascertained that in a dairy beverage, or gelled or soured foods thereof, the flavor of the nuts, in particular, derived from the unskinned, dry- or oil-roasted nuts, harmonizes well with that of milk, and creates a favorable flavor. The inventors have also found that the above nut paste should essentially contain two kinds of surfactants, one of which is a lipophilic one and another of which is a hydrophilic one, a thickener and sugar and should essentially be free from coarse particles over 105 microns in diameter. More particularly, the particle size is such that over 80% is not more than 25 microns and over 95% is not more than 46 microns, respectively. If the paste contains a substantial number of coarse particles having a diameter over about 105 microns, it becomes difficult to prevent precipitation of coarse particles, which is unsuitable for a beverage. Moreover, such coarse particles give an uneven mouth-feel to the consumer due to sedimentation of nut particles in the product. In the practice of the present invention, the paste does not contain over about 0.1% by weight of coarse particles having a diameter over 105 microns. It is possible to remove all particles over 105 microns in diameter; however, productivity would be low. The few remaining coarse particles (0.1% maximum) can be economically removed during later stages involving production of products derived from the paste.

The surfactants are necessary to disperse the large quantity of fat released from the ground nuts in milk in the form of an oil-in-water emulsion.

Although sugar is not so essential as the surfactants, it becomes inefficient to grind or to mill the nuts unless sugar is used. In addition, sugar gives a desirable sweet taste to the dairy product and further prevents the precipitation of particles in cooperation with the thickener. It is preferable to use 0.1 to 3.0 parts by weight of the surfactants and 5 to 30 parts by weight of sugar for 100 parts by weight of nuts.

The nut paste of this invention contains a small quantity of a thickener. It is advisable to employ 0.01 to 5.0 parts by weight of a thickener for 100 parts by weight of nuts, depending on the thickener used, the form of the final product, and the quantity of the nut paste in the final product. If the final product is a gelled product such as Bavarian cream, it is necessary to use a relatively large quantity of the thickener.

The surfactant is used to disperse the fats of the almond nuts into milk. We have found that, in order to stably disperse the complicated ingredients of the almonds, it is preferable to use a nonionic hydrophilic surfactant and a nonionic lipophilic surfactant, in combination. We have also found that it is the best way to combinedly use a hydrophilic surfactant having a hydrophilic lipophilic balance (HLB) more than 7 and a lipophilic surfactant having an HLB less than 6, with the mean HLB of the surfactants used being between 10 and 15.

"HLB" is a term well known in the art with respect to surfactants, as for example, discussed by W. G. Griffin, *J. Soc. Cosmetic Chem.*, Vol. 1, Page 311 (1949). The mean HLB value in the emulsion systems used in the present invention is calculated according to the following formula from J. T. Davies and E. K. Rideal, "Interfacial Phenomena", Academic Press, New York (1961), Page 366:

$$\text{mean } HLB = \frac{Wa \times HLBa + Wb \times HLBb}{Wa + Wb}$$

Wa: weight (grams) of surfactant A
Wb: weight (grams) of surfactant B
HLBa: HLB of surfactant A
HLBb: HLB of surfactant B.

Suitable examples of a nonionic surfactant include lipophilic ones such as lecithin, monoglycerides of higher fatty acids, higher fatty acid esters of propylene glycol and higher fatty acid esters of sorbitan, and hydrophilic ones such as higher fatty acid esters of polyglycerol, higher fatty acid esters of polyoxyethylenesorbitan, monoglycerides of malic acid and monoesters of sugar (so-called "sugarester"). But, the above classification as to "lipophilic" and "hydrophilic" is only for convenience. Thus, many agents listed above may convert to "hydrophilic" or to "lipophilic" depending on the proportion of lipophilic and hydrophilic groups contained therein. Accordingly, it is advisable to practice on the basis of actual HLB values and mean HLB of surfactants used in the emulsion system.

The thickener, which is generally a hydrophilic polymer, serves to suspend nut particles in milk, or to gelatinize milk containing nut paste. Suitable examples of the thickener include the following:

(I) Seaweed polysaccharides, such as agar, carrageenan, furcellaran, and sodium alginate or propylene glycol ester of alginic acid;
(II) Seed mucilages, such as locust bean gum, guar gum and tamarind gum;
(III) Mucilages, such as gum arabic, tragacanth gum and karaya gum;
(IV) Fruit mucilages, such as pectin and arabinogalactan;
(V) Bacterial mucilages, such as xanthan gum, pullulan and curdlan;
(VI) Starches, and processed starches, such as modified starch, dextrin, carboxymethyl starch (CMS), and starchphosphates;
(VII) Cellulosic mucilages, such as micro-crystalline cellulose (for example under the trade name of "Avicel"), carboxymethyl cellulose (CMC), methyl cellulose (MC), and sodium cellulose glycolate;
(VIII) Proteins, such as gelatin, casein, sodium caseinate, soybean protein, wheat protein, egg white, plasma protein and milk serum protein; and
(IV) Synthetic mucilages, such as sodium polyacrylate.

The above thickeners may be used alone or in combination depending on the kinds and the characteristics of the products desired.

If the final product is almond milk, it is advisable to use a thickener having a low gelation property and low viscosity, such as guar gum, tamarind gum, carrageenan, furcellaran, sodium alginate, tragacanth gum, gum arabic, arabinogalactan, xanthan gum, sodium caseinate, CMC or micro-crystalline cellulose, since it is desirable to maintain a relatively low viscosity in the almond milk obtained.

If it is desired to produce yogurt by lactic fermentation, it is generally possible to use the same thickeners as above, but it is more ideal to employ a thickener forming a gel by an interaction with lactic acid, for example, HM pectin. If, on the other hand, it is intended to obtain a gelled food such as Bavarian cream, it is recommended to use a thickener having high gelling power, such as locust bean gum or xanthan gum together with carrageenan, furcellaran, agar, LM pectin, pullulan, gelatin or egg white. It is particularly suitable to use LM pectin for making Bavarian cream, since it forms a firm gel in combination with milk protein.

Sugar assists grinding of nuts by absorbing their fat and the emulsification of the nuts' components, and gives an appropriate sweetness to the product. It is possible to use any sugar, including sucrose, glucose, fructose, maltose, inverted sugar, isomerized sugar, xylose, or any other sweet monosaccharide or disaccharide, or sweet polyhydric alcohol. If it is desired to restrict the sweetness of the product, it is preferred to use sugar of low sweetness, such as lactose, oligosaccharides, and polysaccharides.

The milk used in this invention is usually natural milk or reconstituted milk, but a filled milk or an imitation milk in which the protein and/or fat of the natural milk is partially or completely substituted with any other protein and/or fat may be used, if desired. The use of filled and imitation milks is advantageous, since they are less expensive than natural milk. If milk protein is replaced by vegetable protein such as soybean protein, or if milk fat is replaced by vegetable fat, there is obtained a product which is suitable for use as a health or diet food, since vegetable protein has a desmutageneic activity, and vegetable fat never contains cholesterol that may induce sclerosis of blood vessels or thrombosis of arteries. The term "milk" used herein naturally includes reconstituted milk produced from skim milk and milk fat and the skim milk may be prepared from powdered skim milk.

Nuts are roasted in the unskinned state. The roasting of the nuts is necessary for fully generating their aroma and to eliminate their beany and harsh tastes. The skin layer is supposed to act as a barrier for preventing the escape of flavor and aroma due to volatilization during roasting. In fact, nuts have a very poor aroma when dry-roasted or oil-roasted after their skins have been removed.

The dry-roasting is carried out by heating directly unskinned nuts in a roaster such as a rotary roaster until sufficient flavor and aroma are generated. The roasting conditions vary depending on many factors, such as the quantity of raw nuts loaded, the type of the roasting apparatus, the kinds of nuts and the heat source employed, as in roasting of coffee beans, and therefore it should be determined case by case experimentally and empirically. It is, however, generally advisable to heat unskinned nuts at a temperature of 100° C. for 1 to 180 minutes.

Nuts may be oil-roasted, if required. Oil-roasted nuts produce an aroma which is somewhat different from that of dry-roasted nuts, but which is well harmonizable with many milk products. For oil-roasting, it is generally suitable to heat nuts at a temperature of 140° C. to 170° C. for 1 to 15 minutes, and more preferably for 3 to 5 minutes.

Dry-roasted or oil-roasted nuts may be ground by a roll mill, kneader, impact crushing machine, silent cutter, ball mill, or the like. However, the use of the roll mill is generally preferable. The surfactant, sugar and thickener are mixed with the rough crushed nuts prior to grinding by a roll mill. The sugar raises the efficiency of the grinding work by adsorbing fat exuded from the nuts, and preventing triturate from adhering to the rolls, or the like. The grinding work must be repeated until the paste obtained is essentially free of any coarse particles larger than 105 microns. If the grinding is performed with a roll mill adjusted so as to have a narrow roll gap under the addition of an appropriate amount of the sugar, a single grinding can cause a fine dividing effect that over 80% of the nuts are divided into not more than 25 microns and over 95% into not more than 46 microns. If a kneader is employed, however, there is obtained a paste showing a particle size distribution having a peak in the vicinity of 46~63 microns and a tail toward a larger diameter. If the paste contains a substantial quantity of coarse particles having a diameter exceeding 105 microns, it gives a coarse feeling to the tongue, and causes rapid precipitation when it is suspended into milk.

The nut paste of this invention can easily be suspended into milk by only stirring. But, mere stirring may be insufficient to completely break up large particles formed by reaggregation. So, it is advisable to use a high speed mixer, such as a homomixer, for dispersing the paste, and if possible, further to use a homogenizer, for dividing the paste into finer particles. The nut milk thus prepared is stable and it does not form any precipitation when it is allowed to stand, and retains its good flavor derived from dry-roasted or oil-roasted nuts. Therefore, it is a novel and excellent dairy beverage. The milk may contain about 1 to 5% to said milk of the paste, depending on the taste to be preferred. The use of too much paste makes the nut milk too heavy to drink, since natural milk originally contains about 3% of fat and about 8% of non-fat solids.

It is thus preferred to use appropriately diluted milk, if the flavor and taste of the nuts per se are intended to be emphasized. Moreover, if it is desired to make a product having a long life, it is preferred to subject homogenized milk to instantaneous sterilization by a UHT sterilizer at a temperature of 140° C. to 150° C. for about 1 to 2 seconds, and then pack aseptically in a Tetrapak ® or Brick ® carton. The paste of this invention provides a tasty drink, even if it is merely dispersed into cold or warm water.

One of the preferred forms of the application of the nut milk prepared from the paste of this invention is as a nut yogurt obtained by lactic fermentation of the nut milk. The inventors have discovered that the components of the nuts do not inhibit the formation of yogurt, but rather have a favorable effect thereon.

Lactic acid bacteria starters which can be used for lactic fermentation include *Lactobacillus bulgaricus, L. acidophilus, Streptococcus thermophilus, S. lactis,* and *S. cremoris.* All the commercially available starters are usually mixtures of two or three kinds of lactic acid bacteria. For example, there is available a starter consisting of *L. bulgaricus* and *S. lactis,* 1:4 by weight. It is sufficient to add about 2% of the starter to nut milk. After the starter has been added to appropriately sweetened nut milk, the milk is held at a temperature of 30° C. to 40° C. for about 10 hours until its acidity becomes 0.9% to 1.0%, and then, it is stored in a refrigerator. For the preparation of yogurt, it is, of course, not necessary to use diluted milk, and it is possible to use a larger quantity of the paste than the amount of the paste for preparing the nut milk as a drink.

Another preferred form of the application of the nut milk containing the paste of this invention is in Bavarian cream. The nut milk is sweetened appropriately, heated on a low fire, and cooled until the gelled product, that is, Bavarian cream, is obtained.

Still another preferred form of the application of the nut paste according to this invention is to prepare sour milk from the nut milk. Skim milk or its powder is used, and it is also preferable to use low fat nut paste made of defatted roasted nuts. This defatting of the nuts can be carried out by compressing unskinned raw nuts with an oil cage press prior to the roasting. So long as the water content and the pressure are appropriate, a substantial amount of the fat can be squeezed out from the raw nut up to one-half or more of the original oil content in said nuts without crushing of the nuts. Also in the nut sour milk, it is preferred that the oil content is comparatively low, thus, the oil content of the nuts for this purpose is preferably lowered by the static compression up to one-half or less prior to the roasting.

The paste thus obtained is then dispersed into skim milk, and the dispersing is further subjected to a lactic fermentation by a bacterial starter. The curd formed is then homogenized with a sugar.

A further application of the paste of this invention is use for syrup. This syrup can be prepared by fully mixing the paste with syrup and the product is useful for an almond beverage through dilution with an appropriate medium such as water, coffee, tea or chocolate drinks, or for use as a topping for yogurt, cakes or fruits.

According to the present invention, the nuts paste may be admixed with a minor amount of another paste that is derived from another starch-poor nut such as peanut, hazel nut, macadamia, pistachio, walnut, pecan, pine nut and, seeds of sunflower and/or pumpkin, and which is characterized by the particle size parameters disclosed herein for the almond nut paste.

Among these non-almond nuts, hazel nut, pistachio or macadamia are preferred. The addition of such non-almond nuts gives desirable variation to the sole taste of the almond paste. However, in order to prevent decrease in the flavor and taste of almonds, it is preferred the proportion of such non-almond nuts should be kept to one-half or less based on weight of the almond nuts used.

The invention will further be illustrated by the following examples, but such examples are for mere illustration and not for limitation. Therefore, it should be understood that there are numerous modifications and alterations within the spirit of the present invention which will be apparent to the skilled artisan, other than the examples.

EXAMPLE 1

Preparation of Almond Paste (1)

Ten kilograms of unskinned almonds, from which the shells had been removed, were placed in a coffee bean roaster and roasted for 30 minutes with a flame of fuel gas at an ambient temperature of 170° C. The nuts were discharged from the roaster, and cooled immediately with dry, cool air. The roasted nuts were then sifted so as to remove the fragments of the skin.

The fine roasted nuts thus obtained (9 kg) were then mixed well with an intimate mixture of 2,000 g of white sugar, 10 g of furcellaran, 1 g of soybean lecithin (HLB 6) and 10 g of polyoxyethylene (60) sorbitan monostearate (HLB 14.9). The mean HLB value was 14.1. The resulting mixture was placed in the hopper of a roll mill provided with five rolls, having the roll gap between shearing rolls adjusted to 0.1 mm, and ground well with said roll mill. The resultant paste showed a nut particle size distribution as shown by a single-dot chain line in the Drawing. It will be noted therefrom that at least 80% by weight of the particles had a diameter not exceeding 25 microns, while substantially all the remaining particles had a diameter not exceeding 105 microns. The amount of particles above 105 microns, about 0.1% in Example 1, is not depicted in the "approximate" graph of the Drawing. At least 95% by weight of the particles were not more than 46μ in particle size.

This paste has a specific flavor derived from dry-roasted almond and it is useful as the starting material for the production of almond milk as described below. Besides, this paste is stable for over a year, if hermetically stored in a refrigerator. This paste gave the following analytical data by a food analytical method.

Protein: 20.1%
Fat: 38.4%
Sugar: 34.3%
Fiber: 1.2%
Ash: 3.2%
Water: 2.8%
Calorie (per 100 g): 568.0 Cal.

EXAMPLE 2 (COMPARATIVE TEST)

Preparation of Almond Paste (2)

The procedures of Example 1 were repeated, except that the shearing rolls gap was changed to 0.2 mm. The paste thus obtained had somewhat larger particle size as compared with that of Example 1, and had a peak of the maximum particle size distribution at the vicinity of 46-63 microns in diameter as shown by the solid line in the Drawing. But the maximum size of the particles did not exceed 250 microns. This product caused slight sedimentation when dispersed into milk according to Example 4 hereinbelow.

EXAMPLE 3

Preparation of Almond Paste (3)

The procedure of Example 1 were repeated, except that a kneader (Tokushu Kika Kogyo L type mycolloider) was used instead of the roll mill. The paste thus obtained presented a broad particle size distribution having a peak in the vicinity of 37 to 46 microns, and the distribution indicated a high tailing tendency as shown by a broken line in the Drawing. Accordingly, the use of such kneader is not suitable for making the paste of this invention.

EXAMPLE 4

Preparation of Almond Milk

Five liters of deionized water, 420 g of the almond paste obtained by Example 1 and 470 g of granulated sugar were added into 5 liters of commercially marketed milk containing 3.2% fat and 8.2% non-fat solids. The mixture was preliminarily emulsified, by stirring at 60° C. for about 5 minutes with a homomixer at a speed of 5,000 rpm.

The crude emulsion formed was filtered through 100 mesh cloth in order to remove the undispersed aggregates and then further emulsified completely with a high pressure homogenizer at a pressure of 150 kg/cm$^2$. The emulsion obtained was sterilized at 145° C. for 2 seconds with an indirect-heating pilot UHT sterilizer and packed aseptically in a 200 ml Tetrapak (trademark), whereby a sterile almond milk product was obtained. The product was a tasty beverage having a harmonized flavor due to specific aroma of the roasted almond and taste of milk.

Although the paste containing the surfactants and other additives was used herein, the same results can also be obtained when the almond paste and other additives are added into plain milk, and then the mixture is subjected to preliminary and final emulsification. The use of the paste composition containing the surfactants is merely intended for convenience in the direct use of the paste in the manufacture of almond milk. Therefore, the scope of this invention, of course, covers any almond milk prepared from an almond paste lacking any of the additional components recited in the appended claims, if the lacking component(s) is (are) incorporated during the later stage of manufacture.

EXAMPLE 5

Preparation of Almond Yogurt

The procedures of Example 4 were repeated for manufacturing almond milk, except that 840 g of the paste prepared in Example 1 and 810 g of granulated sugar were added into 10 liters of the commercially marketed milk. The almond milk obtained was warmed to 37° C., and 200 g of a yogurt starter were added thereinto. The milk was poured into commercially marketed yogurt cups, and the cups were kept for 10 hours in an incubator kept at 37° C. Then, covers were applied to the cups, and the cups were immediately placed in a refrigerating chamber kept at 4° C. The yogurt thus obtained was tasty having the flavor and taste of almonds.

EXAMPLE 6

Preparation of Almond Bavarian Cream

The procedures of Example 4 were repeated for preparing almond milk, except that 870 g of the almond paste prepared in Example 1 and 470 g of granulated sugar were added into 10 liters of commercially marketed milk. The almond milk was placed in an open pan with a stirrer, and heated by live steam, with stirring until it boiled. The heated product was poured into ice cream cups while it was still hot. Then the cups were covered and then placed in a refrigerating chamber (5° C.). Bavarian cream was thus obtained, usable as a tasty dessert and it retained the flavor of almonds.

EXAMPLE 7

Preparation of Almond Sour

Five hundred grams of almonds were roasted in accordance with the procedures of Example 1. The roasted almonds were placed in the cage of portable hydraulic oil squeezer, amd compressed at 200 kg/cm$^2$ until about 50% of nut fat was squeezed away from the nuts. There was added into the remaining meal 200 ml of water, 300 g of white sugar, 10 g of sugar esters consisting of 3 g of sucrose distearate (HLB 5) and 7 g of sucrose mono-stearate (HLB 15) so as to form mean HLB value of 12, and 8 g of sodium caseinate. The mixture was ground for 10 minutes in a homomixer, and formed into a viscous paste. Five hundred grams of this paste were added into 10 liters of skim milk, and the mixture was stirred for five minutes in the homomixer.

The remaining aggregates were removed by filtration through flannel cloth having a fine mesh size, and the filtrate was homogenized by a homogenizer. The homogenate containing almond particles was sterilized by heating at 90° C. for 10 minutes. Then, 200 g of the pure culture (starter) of *Lactobacillus bulgaricus* were added into the sterilized milk to cause its fermentation at a temperature of 37° C. to 40° C. until an acidity exceeding 2% was reached. The curd formed was collected, and crushed in the homomixer. Then, 8 kg of white sugar were added into the crushed curd, and another 8 kg of white sugar were added thereinto little by little, while it was gradually heated. The temperature was raised to 75° C. when the mixture formed a translucent syrup. The syrup was filtered and the filtrate was homogenized and then cooled. The homogenate was then divided into 720 ml bottles, whereby almond sour, a tasty product retaining the aroma of almonds, was obtained. It is diluted with cold or warm water to about five volumes when it is drunk.

EXAMPLE 8

Preparation of Almond Paste (4)

The experiment of Example 1 was repeated using 5 kg of unblanched dry-roasted almond, 2 kg of dry-roasted blanched almonds and 2 kg of oil-roasted macadamia nuts instead of 10 kg of dry-roasted unblanched almonds. The product had good flavor and taste, but somewhat differed from that of the former example, and also had good dispensibility in milk.

EXAMPLE 9

Preparation of Almond Syrup

To 2.6 kg of water, there were added 2.2 kg of granulated sugar and 2 kg of millet jelly, and the mixture was heated to 60° C. with stirring for resolution. To this syrup, 2.2 kg of almond paste obtained according to Example 1 were added and admixed therewith. The mixture was then homogenized through a high pressure homogenizer in the condition of 100 kg/cm$^2$ and thereafter sterilized for 20 minutes at 105° C. after packing into pouches.

The product was of good quality with excellent stability, showing no phase separation during a long term test without movement.

EXAMPLE 10

Preparation of Almond Paste

The experiment of Example 1 was repeated using 50 g of soybean lecithin (HLB 6) and 200 g of sucrose monostearate (HLB 15). The mean HLB of the surfactants used was 13.2 The result was satisfactory, similar to that of the base example.

EXAMPLE 11

Preparation of Almond Paste

The experiment of Example 1 was repeated using 70 g of sorbitan monostearate (HLB 4.7) and 90 g of sucrose monostearate (HLB 15). The mean HLB of the surfactant used was 10.5. The result was satisfactory, similar to that of the base example.

While the invention has been described in detail and with reference to specific embodiments thereof, it will be apparent to one skilled in the art that various changes and modifications can be made therein without departing from the spirit and scope thereof.

What is claimed is:

1. A homogeneous mixture for beverages and desserts, comprising a finely ground almond paste derived from unskinned dry- or oil-roasted almonds wherein substantially all of the almonds have a maximum particle size of not more than 105 microns, with more than 80% by weight of a particle size not more than 25 microns and with more than 95% by weight of a particle size not more than 46 microns, and also containing two types of nonionic surfactants, one being selected from hydrophilic surfactants of HLB not less than 7 and the other from lipophilic surfactants of HLB not more than 6 with the mean HLB of the surfactants used being more than 10 and less than 15, and a thickener and a sugar.

2. A nut beverage, comprising a finely ground almond paste derived from unskinned dry- or oil-roasted almonds wherein substantially all of the almonds have a maximum particle size of not more than 105 microns, with more than 80% by weight of particle size not more than 25 microns and with more than 95% by weight of particle size not more than 46 microns, two types of nonionic surfactants, one being selected from hydrophilic surfactants of HLB not less than 7 and the other from lipophilic surfactants of HLB not more than 6 with the mean HLB of the surfactants used being more than 10 and less than 15, a thickener, a sugar and a milk, milk substitute or other aqueous based liquid.

3. A nut sour in the form of an acidic liquid mixture comprising a finely ground almond paste derived from unskinned dry- or oil-roasted almonds substantially all having a maximum particle size of not more than 105 microns, with more than 80% by weight of a particle size not more than 25 microns and with more than 95% by weight of a particle size not more than 46 microns, two types of nonionic surfactants, one being selected from hydrophilic surfactants of HLB not less than 7 and the other from lipophilic surfactant of HLB not more than 6 with the mean HLB of the surfactants used being more than 10 and less than 15, a thickener, sugar and soured milk.

4. A nut syrup, in the form of a homogeneous aqueous mixture comprising a finely ground almond paste derived from unskinned dry- or oil-roasted almonds substantially all having a maximum particle size of not more than 105 microns, with more than 80% by weight of particle size not more than 25 microns and with more than 95% by weight of particle size not more than 46 microns, two types of nonionic surfactants, one being selected from hydrophilic surfactants of HLB not less than 7 and the other from lipophilic surfactants of HLB not more than 6 with the mean HLB of the surfactants used being more than 10 and less than 15, a thickener, sugar and water or an aqueous based liquid.

5. A method for manufacturing a nut paste, which comprises grinding unskinned dry- or oil-roasted almonds together with sugar so as to form a fine nut paste of almond particles substantially all of which are of a particle size of not more than 105 microns, with more than 80% by weight of particle size not more than 25 microns and with more than 95% by weight of particle size not more than 46 microns, together with two types of nonionic surfactants, one being selected from hydrophilic surfactants of HLB not less than 7 and the other from lipophilic surfactants of HLB not more than 6 with the mean HLB of the surfactants used being more than 10 and less than 15.

6. A method of manufacturing a nut beverage, which comprises suspending a homogeneous mixture comprising a finely ground almond paste derived from unskinned dry- or oil-roasted almonds substantially all of which have a maximum particle size of not more than 105 microns, with more than 80% by weight of a particle size not more than 25 microns and with more than 95% by weight of a particle size not more than 46 microns, two types of nonionic surfactants, one being selected from hydrophilic surfactants of HLB not less than 7 and the other from lipophilic surfactants of HLB not more than 6 with the mean HLB of the surfactants used being more than 10 and less than 15, a thickener and a sugar in milk or a milk substitute.

7. A method of manufacturing a nut sour, which comprises suspending a nut paste comprising a finely ground almond paste derived from unskinned dry- or oil-roasted almonds substantially all of which have a maximum particle size of not more than 105 microns, with more than 80% by weight of a particle size not more than 25 microns and with more than 95% by weight of a particle size not more than 46 microns, two types of nonionic surfactants, one being selected from hydrophilic surfactants of HLB not less than 7 and the other from lipophilic surfactants of HLB not more than 6 with the mean HLB of the surfactants used being more than 10 and less than 15, a thickener and sugar in skim milk or a skim milk substitute, and subjecting the resultant suspension to a lactic fermentation.

8. A method of manufacturing a nut sour, which comprises suspending a nut paste comprising a finely ground almond paste derived from unskinned dry- or oil-roasted almonds substantially all of which have a maximum particle size of not more than 105 microns, with more than 80% by weight of a particle size not more than 25 microns and with more than 95% by weight of a particle size not more than 46 microns, two types of nonionic surfactants, one being selected from hydrophilic surfactants of HLB not less than 7 and the other from lipophilic surfactants of HLB not more than 6 with the mean HLB of the surfactants used being more than 10 and less than 15, a thickener and sugar in soured skin milk or a soured skim milk substitute obtained by preliminary lactic fermentation.

9. A method for manufacturing a nut syrup, which comprises suspending a homogeneous mixture comprising a finely ground almond paste derived from unskinned dry- or oil-roasted almonds substantially all of which have a maximum particle size of not more than 105 microns, with more than 80% by weight of a particle size not more than 25 microns and with more than 95% by weight of a particle size not more than 46 microns, two types of nonionic surfactants, one being selected from hydrophilic surfactants of HLB not less than 7 and the other from lipophilic surfactants of HLB not more than 6 with the mean HLB of the surfactants used being more than 10 and less than 15, a thickener and sugar in water or an aqueous based liquid.

* * * * *